(No Model.)

L. BROWN.
POLICE NIPPERS.

No. 536,067. Patented Mar. 19, 1895.

WITNESSES:
John A. Rennie
C. Sedgwick

INVENTOR
L. Brown
BY
Munn & Co.
ATTORNEYS.

UNITED STATES PATENT OFFICE.

LEON BROWN, OF CHICAGO, ILLINOIS.

POLICE-NIPPERS.

SPECIFICATION forming part of Letters Patent No. 536,067, dated March 19, 1895.

Application filed March 6, 1894. Serial No. 502,542. (No model.)

*To all whom it may concern:*

Be it known that I, LEON BROWN, of Chicago, in the county of Cook and State of Illinois, have invented a new and useful Improvement in Police-Nippers, of which the following is a full, clear, and exact description.

My invention relates to an improvement in police nippers, and it has for its object to provide chain nippers which will require but a single handle, and to so construct the nippers that the loose end of the chain may be expeditiously and conveniently thrown over to an engagement with the handle, forming a loop of the chain, and the handle manipulated to contract the loop upon the wrist of the prisoner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
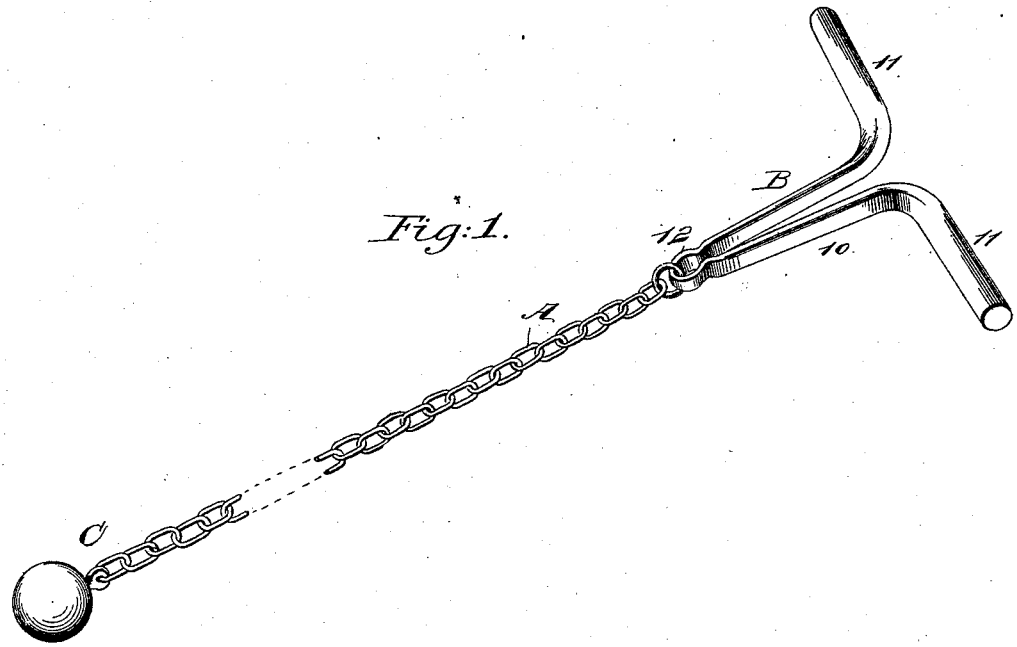
Figure 2:
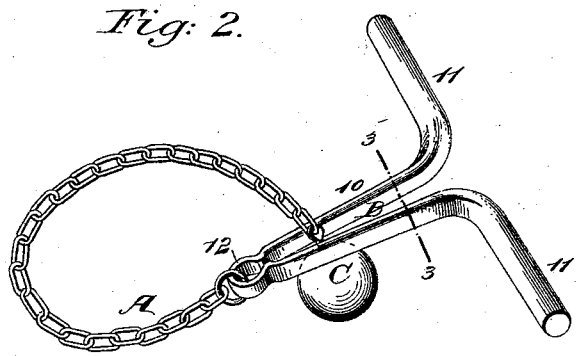
Figure 3:
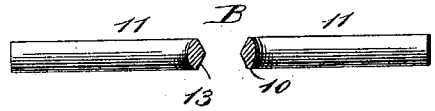

Figure 1 is a perspective view of the nippers, the chain being loosened from the handle. Fig. 2 is a perspective view of the nippers, illustrating the chain in engagement with the handle; and Fig. 3 is a cross section through the handle, taken practically on the line 3—3 of Fig. 2.

In carrying out the invention the nippers may be said to consist of a chain or link body A, a handle B, and a weight C at the free end of the chain or body. The handle B is a T-handle, being provided with a bifurcated and substantially V-shaped shank 10, the grip section of the handle consisting of arms 11 projected in opposite directions, one from the outer end of each member of the shank. An eye 12, or the equivalent thereof, is formed at the inner or contracted end of the shank or handle, and in this eye one end of the chain or link body A, is securely fastened. The chain may be of any desired length, and the weight C, which is located at the free end of the chain, is preferably in the shape of a ball. In cross section each member of the shank of the handle, as best shown in Fig. 3, is provided with a central longitudinal rib or sharp surface 13, since the inner face of each of said members is beveled in opposite directions from the center.

In applying the nippers the handle is grasped with one hand, and the chain is thrown around the wrist of the prisoner, the ball or weight C serving to direct the free end of the chain quickly and effectually into the space between the shank members of the handle; and it will be understood that the ball need not engage with the shank members of the handle, as shown in Fig. 2, in order to cause the free end of the chain to be in locking engagement with the handle, since if any portion of the chain enters the space between the shank members of the handle, when pressure is applied upon the loop thus created the chain will be drawn down into the contracted portion of the shank and the ribs 13 will prevent the chain from being drawn through the handle. The loop can be reduced in diameter when desired by simply turning the handle, which will twist the chain where it connects with the shank of the handle.

Nippers constructed as above set forth are exceedingly simple. They are durable and economic, and may be quickly placed upon the wrist of a prisoner, while but a single handle is required in their construction.

Having thus described my invention, I claim as new and desire to secure by Letters Patent—

1. As an improved article of manufacture, police nippers, comprising a T-handle having a bifurcated shank, open at the grip section of the handle and having the space between the members thereof tapering, and a chain having one end secured to the contracted end of the shank, and its free end adapted to be passed between the members of the shank and held thereby, as specified.

2. As an improved article of manufacture, police nippers, comprising a handle having a bifurcated shank, the space between the members of the shank being tapering, a chain having one end secured to the end of the shank, and its free end adapted to be passed between the members of the shank and held thereby, and a weight on the said free end of the chain, as and for the purpose set forth.

3. In a police nippers, the combination, with a T-handle having a bifurcated shank open at the grip section of the handle, the space between the members of the shank being tapering and the inner face of each shank member being provided with a longitudinal rib, of a chain attached to the shank of the handle, the free end of which is adapted to enter the space between the shank members, as and for the purpose specified.

LEON BROWN.

Witnesses:
BENJ. IVES,
V. H. LOOMIS.